US010771558B2

(12) United States Patent
Shamasundar et al.

(10) Patent No.: US 10,771,558 B2
(45) Date of Patent: Sep. 8, 2020

(54) SYSTEM AND METHOD FOR MODIFYING MULTIPLE REQUEST DATALINK MESSAGES IN AVIONICS SYSTEM

(71) Applicant: Honeywell International Inc., Morris Plains, NJ (US)

(72) Inventors: Raghu Shamasundar, Bangalore (IN); Thomas D. Judd, Woodinville, WA (US); Soumitri Swain, Bengaluru (IN)

(73) Assignee: Honeywell International Inc., Morris Plains, NJ (US)

( * ) Notice: Subject to any disclaimer, the term of this patent is extended or adjusted under 35 U.S.C. 154(b) by 114 days.

(21) Appl. No.: 15/483,735

(22) Filed: Apr. 10, 2017

(65) Prior Publication Data
US 2018/0292954 A1   Oct. 11, 2018

(51) Int. Cl.
G06F 3/048 (2013.01)
G08G 5/00 (2006.01)
H04L 29/08 (2006.01)
G01C 23/00 (2006.01)

(52) U.S. Cl.
CPC ............ *H04L 67/12* (2013.01); *G01C 23/00* (2013.01); *G06F 3/048* (2013.01); *G08G 5/0013* (2013.01); *G08G 5/0021* (2013.01); *G08G 5/0052* (2013.01)

(58) Field of Classification Search
CPC ......... G06F 3/048; H04L 67/12; G01C 23/00; G08G 5/00
See application file for complete search history.

(56) References Cited

U.S. PATENT DOCUMENTS

| 6,313,759 | B1 * | 11/2001 | Musland-Sipper ............ G08G 5/0013 340/945 |
| 7,181,497 | B1 | 2/2007 | Appelman et al. |
| 8,082,070 | B2 | 12/2011 | Gunn et al. |
| 8,626,358 | B2 | 1/2014 | McGuffin et al. |
| 8,633,913 | B1 | 1/2014 | Raghu et al. |
| 8,755,952 | B2 | 6/2014 | McGuffin et al. |

(Continued)

FOREIGN PATENT DOCUMENTS

WO   2012110678 A1   8/2012

OTHER PUBLICATIONS

European Patent Office, "Communication pursuant to Article 94(3) EPC from EP Application No. 15151691.1 dated Jun. 16, 2017", "from Foreign Counterpart of U.S. Appl. No. 14/168,686", dated Jun. 16, 2017, pp. 1-8, Published in: EP.

(Continued)

*Primary Examiner* — Xuyang Xia
(74) *Attorney, Agent, or Firm* — Fogg & Powers LLC

(57) ABSTRACT

Systems and methods for modifying multiple element request datalink messages in avionics system are provided. A method includes generating a plurality of downlink message element information at a verify screen displayed by a display. The method further allows for the changing of at least one downlink message element information of the plurality of downlink message element information within the verify screen. Moreover, the method concatenates the plurality of downlink message element information after the changing of the at least one element information in preparation of generating a concatenating downlink message element information message to be downlinked.

20 Claims, 9 Drawing Sheets

(56) References Cited

U.S. PATENT DOCUMENTS

| | | | |
|---|---|---|---|
| 8,791,840 | B2 | 7/2014 | McGuffin et al. |
| 2008/0163093 | A1 | 7/2008 | Lorido |
| 2009/0089693 | A1 | 4/2009 | Fahy |
| 2009/0228792 | A1 | 9/2009 | Os et al. |
| 2009/0278806 | A1* | 11/2009 | Duarte .................. G06F 3/0416 345/173 |
| 2010/0188266 | A1* | 7/2010 | Judd ..................... G08G 5/0013 340/945 |
| 2010/0229117 | A1* | 9/2010 | Lee ....................... G06F 9/4418 715/810 |
| 2010/0262319 | A1* | 10/2010 | Gunn ................... G06F 3/04895 701/3 |
| 2010/0302277 | A1* | 12/2010 | Jiang ................... G06F 3/04845 345/650 |
| 2011/0289406 | A1 | 11/2011 | Wässingbo |
| 2011/0307867 | A1* | 12/2011 | Murthy ............... G06F 11/3684 717/125 |
| 2012/0054641 | A1 | 3/2012 | Sae-Chim et al. |
| 2012/0066617 | A1 | 3/2012 | Gupta et al. |
| 2012/0078447 | A1 | 3/2012 | McGuffin et al. |
| 2012/0095623 | A1 | 4/2012 | Barral et al. |
| 2012/0306772 | A1 | 12/2012 | Tan et al. |
| 2013/0033387 | A1 | 2/2013 | Trope |
| 2013/0113717 | A1 | 5/2013 | Eerd et al. |
| 2013/0159429 | A1 | 6/2013 | Nalliah et al. |
| 2015/0212671 | A1* | 7/2015 | Judy ..................... G06F 3/0483 715/776 |

OTHER PUBLICATIONS

European Patent Office, "Extend European Search Report from EP Application No. 15151691.1 dated Jun. 8, 2015", "from Foreign Counter part of U.S. Appl. No. 14/168,686", dated Jun. 8, 2015, pp. 1-8, Published in: EP.

European Patent Office, "Summons to attend oral proceedings pursuant to Rule 115(1) EPC from EP U.S. Appl. No. 14/168,686 dated Mar. 29, 2018", "from Foreign Counterpart of U.S. Appl. No. 14/168,686", dated Mar. 29, 2018, pp. 1-10, Published in: EP.

U.S.Patent and Trademark Office, "Office Action for U.S. Appl. No. 14/168,686", dated Sep. 23, 2015, pp. 1-6, Published in: US.

US Patent and Trademark Office, "Advisory Action for U.S. Appl. No. 14/168,686", dated Jun. 16, 2016, pp. 1-3, Published in: US.

US Patent and Trademark Office, "Advisory Action for U.S. Appl. No. 14/168,686", dated Sep. 20, 2017, pp. 1-2, Published in: US.

US Patent and Trademark Office, "Final Office Action for U.S. Appl. No. 14/168,686", dated Mar. 10, 2016, pp. 1-22, Published in: US.

US Patent and Trademark Office, "Final Office Action for U.S. Appl. No. 14/168,686", dated Jun. 14, 2017, pp. 1-17, Published in: US.

US Patent and Trademark Office, "Office Action for U.S. Appl. No. 14/168,686", dated Dec. 30, 2016, pp. 1-16, Published in: US.

US Patent and Trademark Office, "Office Action for U.S. Appl. No. 14/168,686", dated May 17, 2018, pp. 1-24, Published in: US.

* cited by examiner

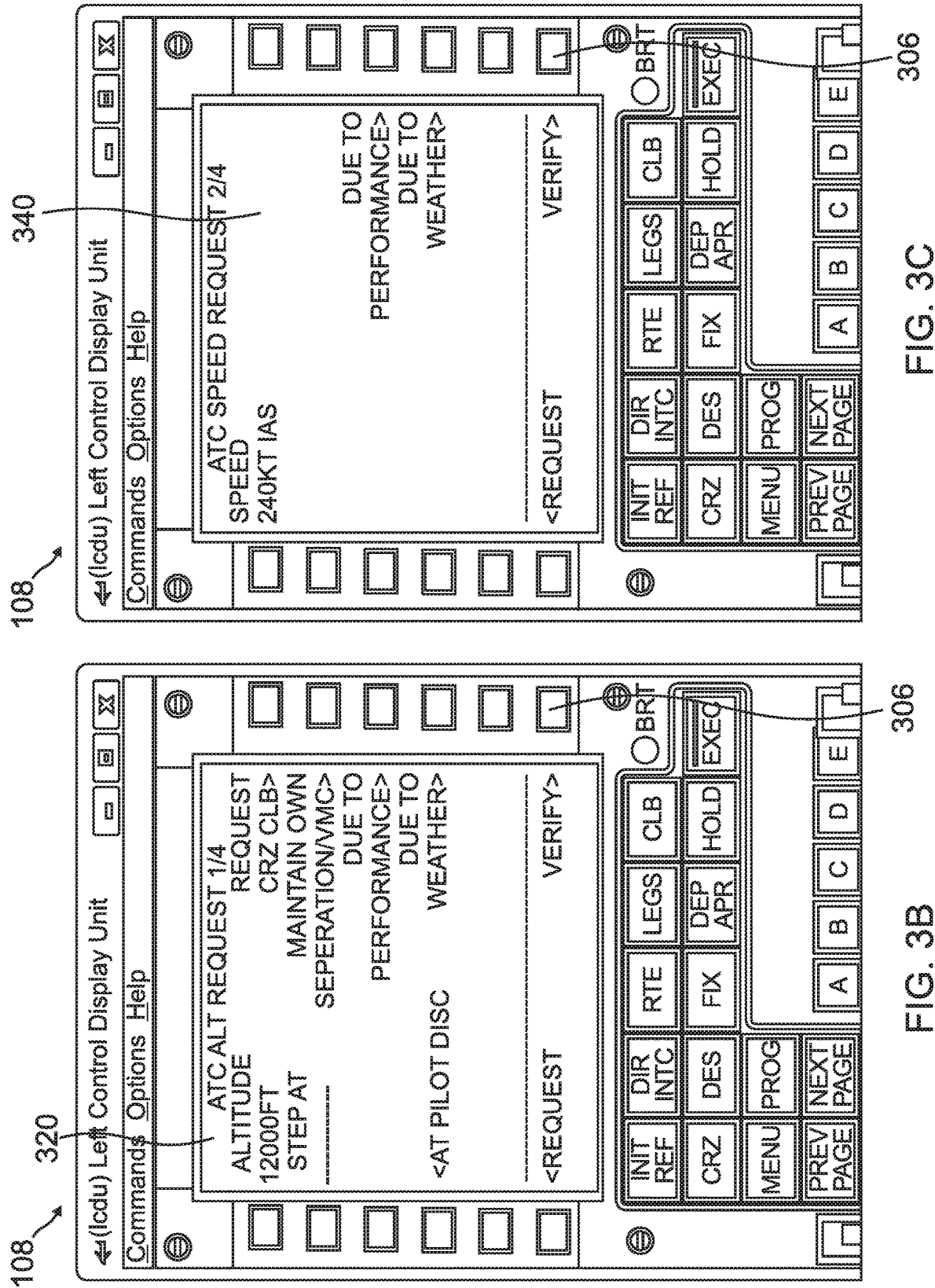

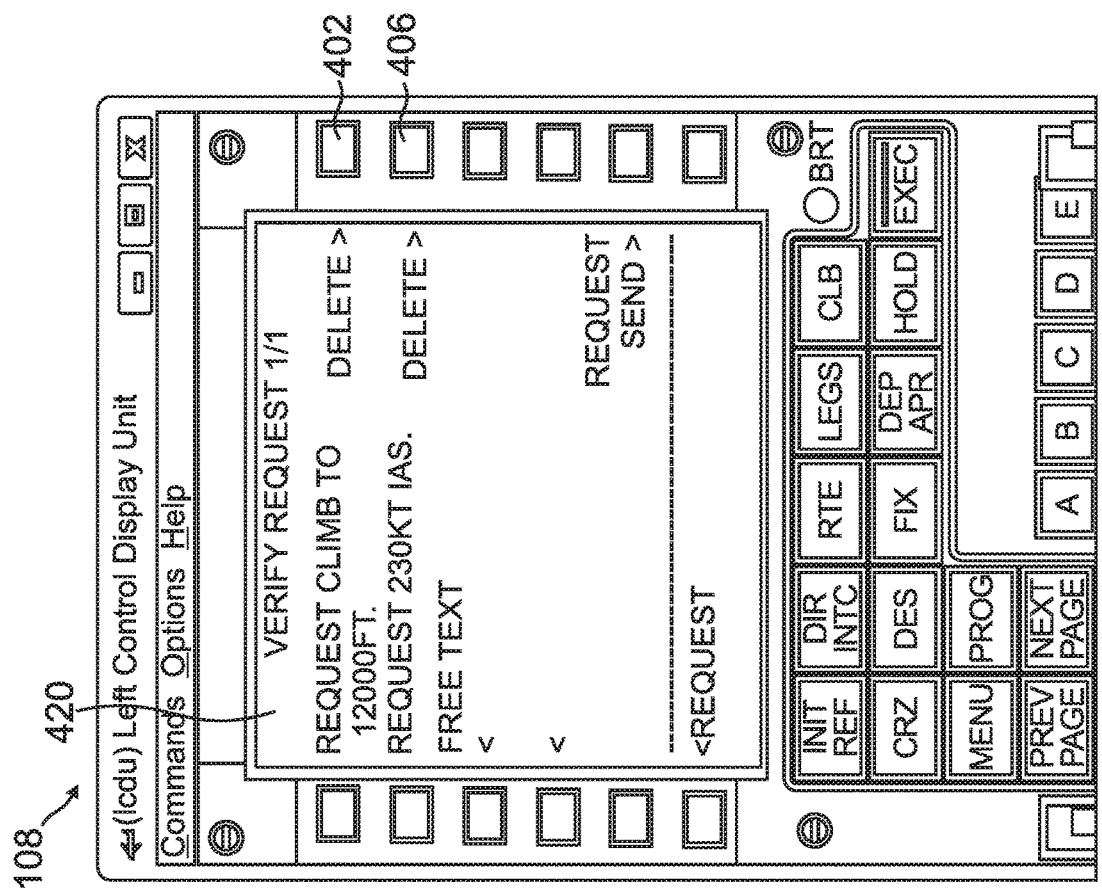
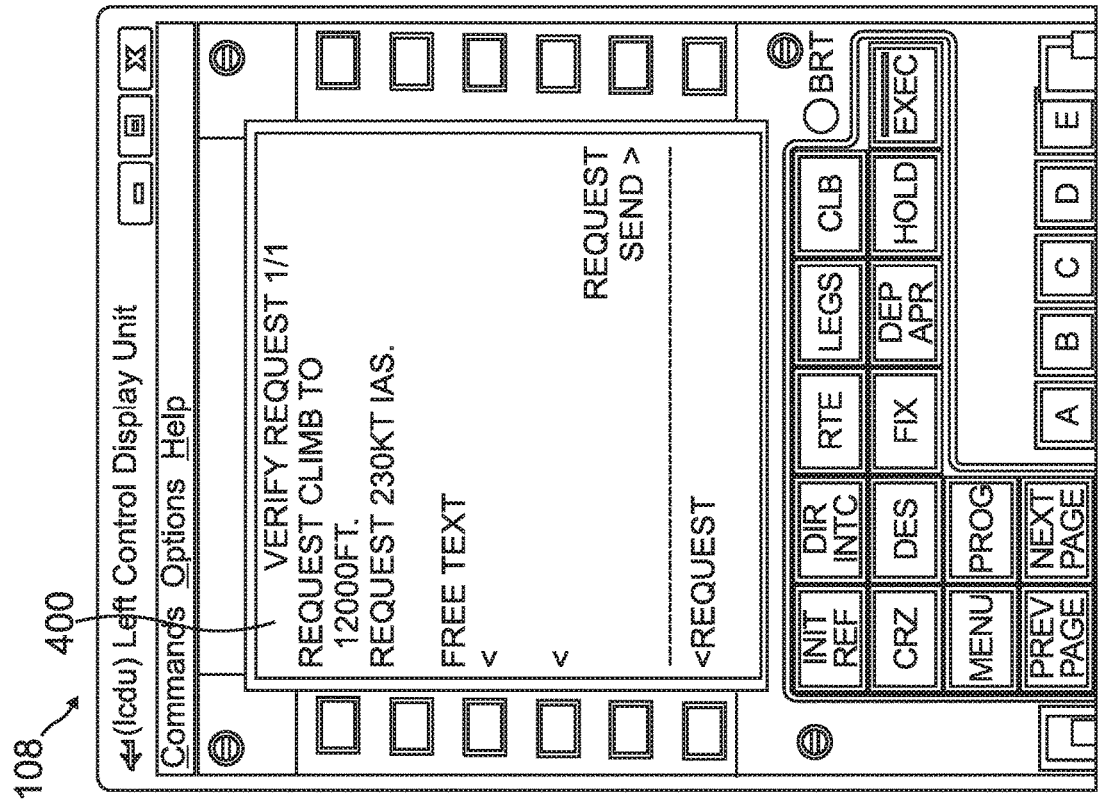
FIG. 4A
FIG. 4B

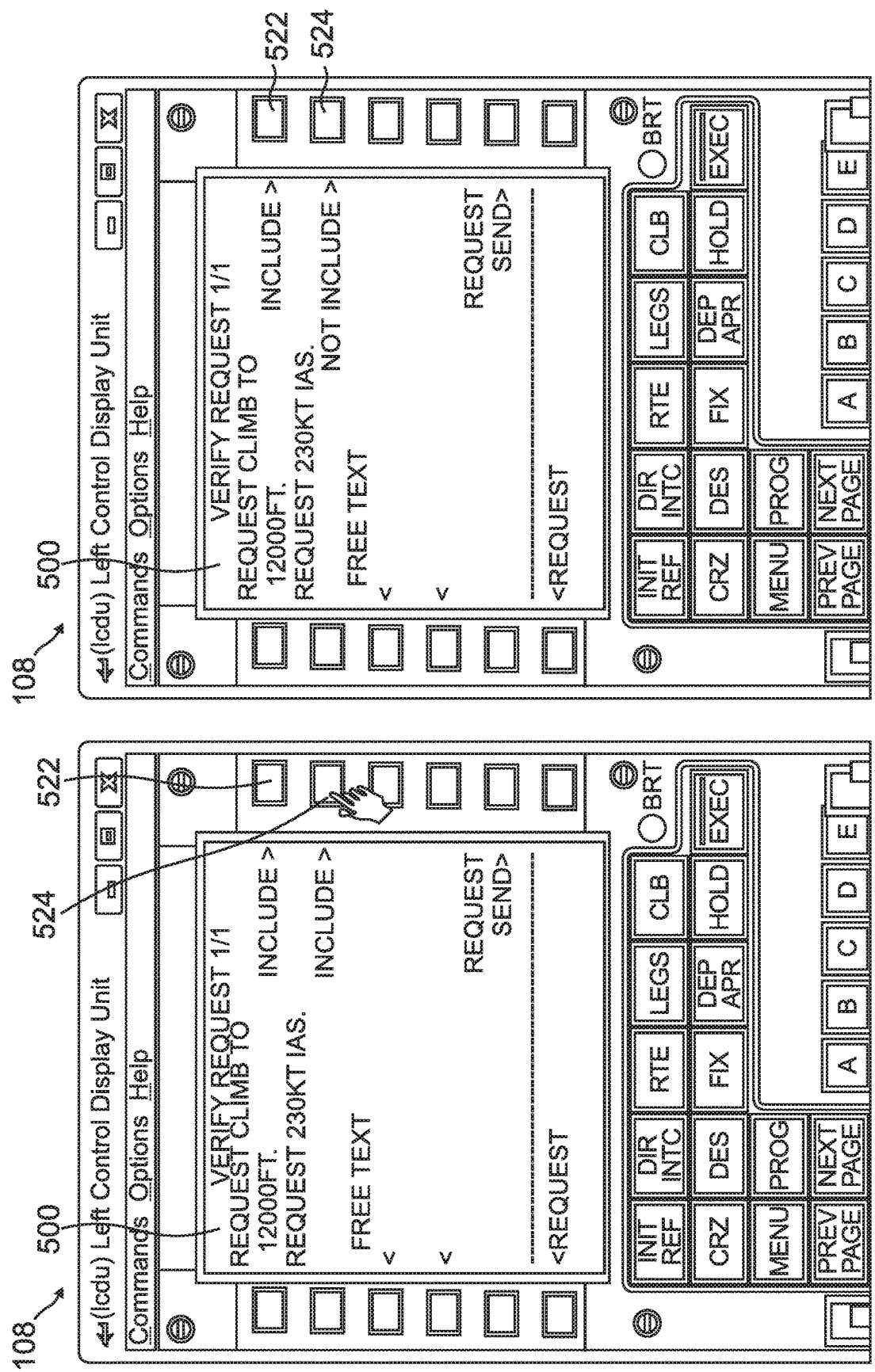

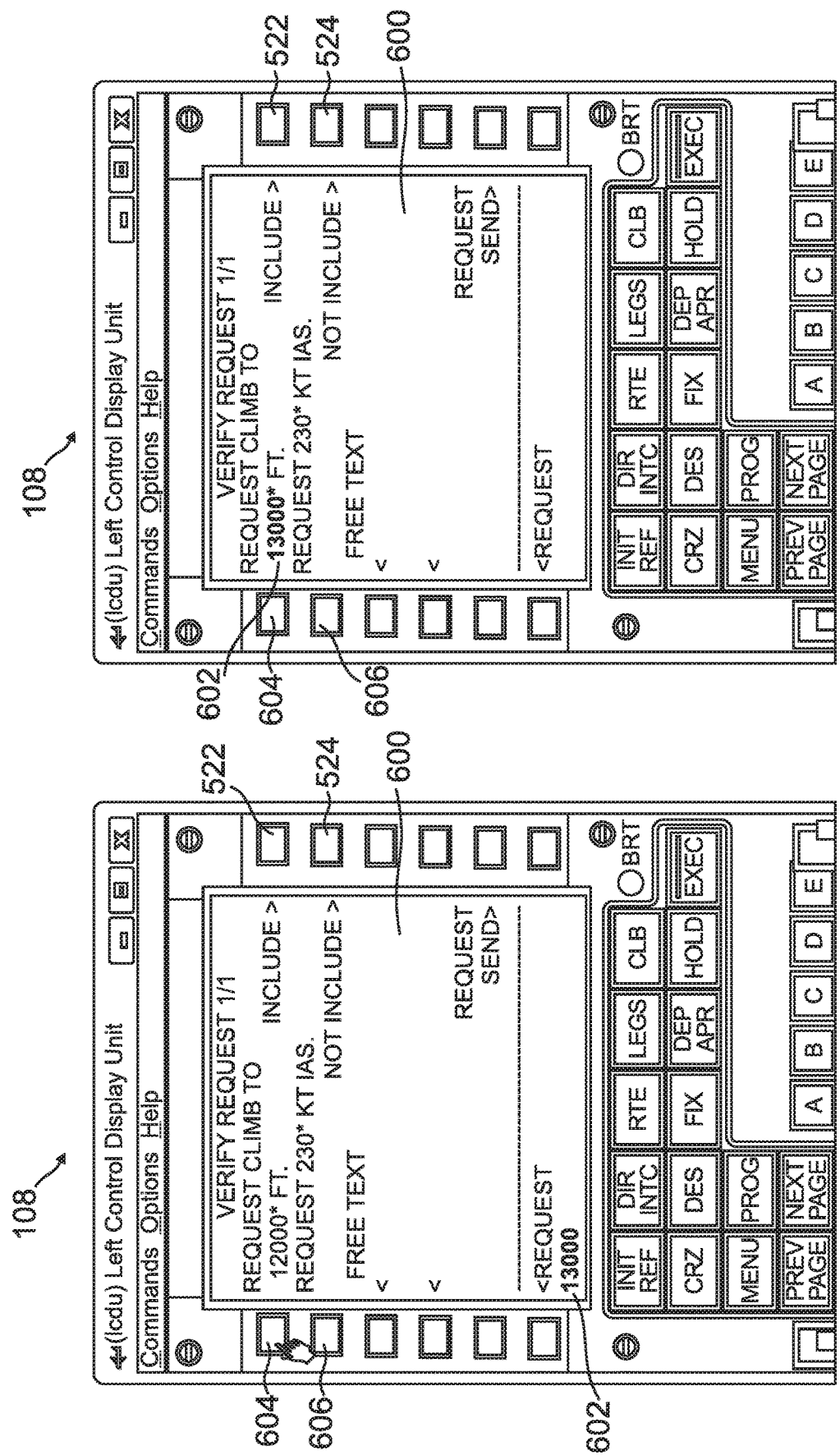

SYSTEM AND METHOD FOR MODIFYING MULTIPLE REQUEST DATALINK MESSAGES IN AVIONICS SYSTEM

BACKGROUND

During the course of a flight, a lot of messages are exchanged between the crew and Air Traffic Control (ATC). One system used to exchange messages through digital media a Processor-Pilot Data Link Communication (CP-DLC) system. Messages generated may be related to clearance/clearance requests due to traffic avoidance, weather avoidance, aircraft performance, etc. enhanced route information or a multitude of other types of information relating to a flight. Moreover, there may be cases where the crew will request multiple ATC message elements within a particular downlink message to an ATC center. Based on availability, the requests may get approved and a communication will be uplinked to the crew in response to the requests. In a typical system, ATC downlink requests are entered on one or more request pages and then verified on a verify page to review the combined message element downlink before the message is downlinked to ATC.

SUMMARY OF INVENTION

The following summary is made by way of example and not by way of limitation. It is merely provided as a summary to aid the reader in understanding some of the aspects of exemplary embodiments. Embodiments allow for communicate requests to a ground station, such as an air traffic control (ATC) to be changed directly in a verify page before a concatenated downlink message element information message is created and downlinked to the ATC.

In one embodiment, a method of operating an aircraft user interface used to convey messages between an aircraft crew and an air traffic controller is provided. The method includes providing at least one air traffic controller downlink message element page to the aircraft crew. A plurality of request options are provided on the at least one air traffic controller downlink message element page. Each request option allows the aircraft crew to enter associated downlink message element information to be sent concatenated together to the air traffic controller. The concatenated downlink message element information includes multiple downlink message element information. A verify page that allows the aircraft crew to review and modify the downlink message element information entered in the at least one air traffic control downlink message element page is provided before sending the entered concatenated downlink message element information to the air traffic controller. At least one of a delete option and an update option is provided on the verify page for at least one of the entered downlink message element information to allow for at least one of the deletion of the at least one of the entered downlink message element information and the updating of the at least one of the entered downlink message element information of the concatenated downlink message element information.

In another embodiment, a method of modifying downlink message element information in a vehicle communication system is provided. The method includes; generating a plurality of downlink message element information at a verify screen displayed by a display; allowing for the changing of at least one downlink message element information of the plurality of downlink message element information within the verify screen; and concatenating the plurality of downlink message element information after the changing of the at least one element information in preparation of generating a concatenating downlink message element information message to be downlinked.

In still another embodiment, a communication system is provided. The communication system includes a transmitter, an input, a display, at least one memory and at least one processor. The transmitter is used to transmit datalink messages. The input provides a conduit for crew requests. The display included input functions and is positioned to be viewed and used by a crew member. The at least one memory stores operation instructions including a downlink application. The at least one processor is in communication with the transmitter, the input, the display and memory. The at least one processor is configured to execute the operation instructions stored in the at least one memory. The processor is configured to provide element pages on the display that allow a crew member to enter input requests via the input. The processor is further configured to display a verify page upon activation of a verify link by the crew member on the display. The verify page includes downlink message element information associated with each request entered on the element pages. The processor is further configured to execute the downlink application to allow for the changing of at least one downlink message element information by the crew member on the verify screen before a transmission of a concatenated downlink message including the downlink message element information.

BRIEF DESCRIPTION OF THE DRAWINGS

The drawings depict only exemplary embodiments and are not therefore to be considered limiting in scope. The exemplary embodiments are described below in detail through the use of the accompanying drawings, in which:

FIG. 3B is a screen shot of the display of FIG. 3A illustrating an altitude request of an exemplary embodiment;

FIG. 3C is a screen shot of the display of FIG. 3A illustrating a speed request of an exemplary embodiment;

FIG. 4A is a screen shot of a display illustrating a verify screen of an exemplary embodiment;

FIG. 4B is a screen shot of a display illustrating a verify screen with delete options of an exemplary embodiment;

FIG. 5A is a screen shot of a display illustrating another verify screen of an exemplary embodiment including an include option;

FIG. 5B is a screen shot of the display of FIG. 5A illustrating a not include option of an exemplary embodiment;

FIG. 6B is a screen shot of the display of FIG. 6A illustrating the entry and activation of new request information entered on the verify screen of an exemplary embodiment; and FIG. 6C is a screen shot of the display of FIG. 6B updated to show the new request information of an exemplary embodiment.

In accordance with common practice, the various described features are not drawn to scale but are drawn to emphasize specific features relevant to the exemplary embodiments. Reference characters denote like elements throughout Figures and text.

DETAILED DESCRIPTION

In the following detailed description, reference is made to the accompanying drawings, which form a part hereof, and in which is shown by way of illustration exemplary embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a communication system that allows a crew to communicate requests to a ground station, such as an air traffic control (ATC) in an efficient and intuitive manner. In embodiments, a verify page is provided that allows for the changing of downlink message element information associated with the requests before a concatenated downlink message element information message is downlinked. Hence, multiple requests can be entered on the various ATC downlink message element pages and the message elements can then be deleted, modified, or not included in a downlink, etc. directly on a verify page. Current systems only allow modifications to be done on the request pages (element pages). Hence, in current systems, a crew member must go back to the element pages and then scroll through the element pages to locate the downlink information message needing to be changed. Once located the downlink information message is then changed at that element page.

Figure 1:
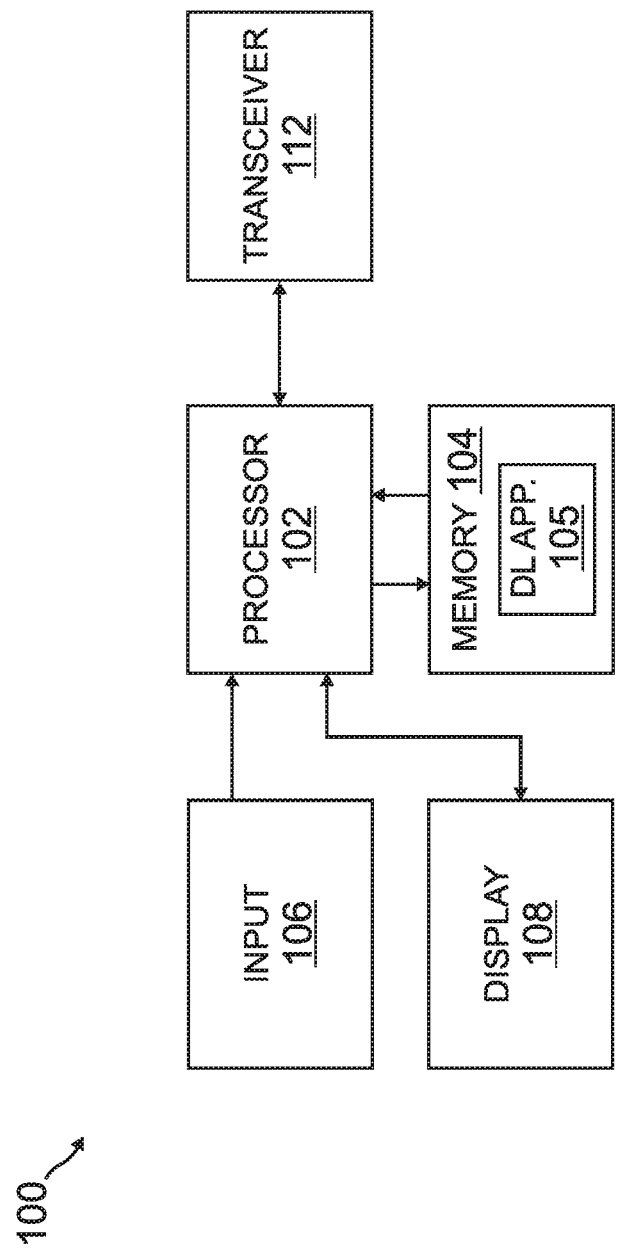
FIG. 1 is a communication system of an exemplary embodiment.

Referring to FIG. 1, a communication system 100 of one exemplary embodiment is illustrated. The communication system 100 includes at least one processor 102 to control operations of the communications system 100. The communication system 100 further includes a memory 104 to store operating instructions of the processor 102 and information gathered from a user input 106 and a receiver 110. The operating instructions include a downlink application 105 that sets out the instruction implemented by the processor 102 in implementing a downlink communication. The communication system 100 further includes a display 108 in communication with the processor 102 and a transceiver 112 to at least in part transmit downlink messages. The transceiver 112 includes a transmitter and a receiver.

In general, the processor 102 may include any one or more of a processor, microprocessor, a digital signal processor (DSP), an application specific integrated circuit (ASIC), a field program gate array (FPGA), or equivalent discrete or integrated logic circuitry. In some example embodiments, processor 102 may include multiple components, such as any combination of one or more microprocessors, one or more processors, one or more DSPs, one or more ASICs, one or more FPGAs, as well as other discrete or integrated logic circuitry. The functions attributed to the processor 102 herein may be embodied as software, firmware, hardware or any combination thereof. The processor 102 may be part of a system processor or a component processor. As discussed above, the memory 104 may include computer-readable operating instructions that, when executed by the processor 102 provides functions of the communication system 100. Such functions may include the functions of downlinking communications described below. The computer readable instructions may be encoded within the memory 104. Memory 104 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 2:
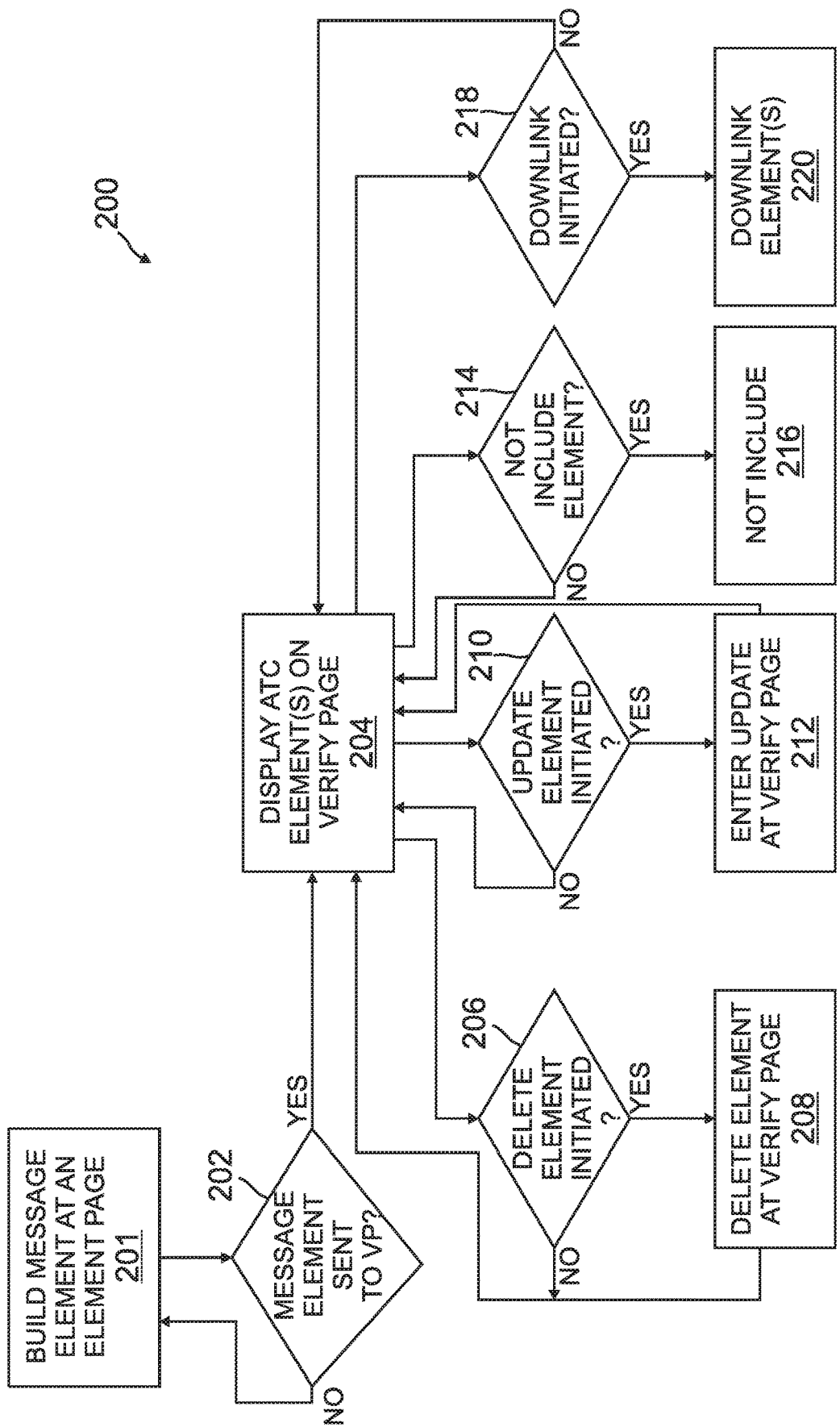
FIG. 2 is a downlink application flow diagram of an exemplary embodiment.

A downlink application flow diagram 200 of an exemplary embodiment is illustrated in FIG. 2. The downlink application flow diagram includes a plurality of steps. Although, this example embodiment sets out the steps in a particular order in other embodiments other orders in which the steps occur are contemplated. As illustrated in FIG. 2, the process starts by building a message element on an element page (201). Message elements may be made up of a request, such as an ATC request, or a report (information) elements, etc. The element page is displayed on the display 108 for use by a crew member. The element page provides a page for the crew to enter one or more requests desired to be downlinked in a downlink message. The crew member may select one or more message elements to be sent (which may include requests or information reports) on various downlink element/request pages and then previewed on a verify screen by selecting the verify link. Once a verify link has been activated at step (202), the message element information is displayed on a verify page of the display at step (204). In embodiments, the crew member is then presented options. One of the options, in an embodiment, is delete one or more of the downlink message element information at step (206). If a downlink message element information is selected to be deleted at step (206), the downlink message element information is deleted at the verify page at step (208). In an embodiment, deleted downlink message element information can be undeleted at the verify page. Another of the options, in this example embodiment, is an update option that allows a downlink message element information to the updated at the verify page. If an update of a downlink message element information is initiated at step (210), the downlink message element information is updated at the verify page (212) with updated information provided by the crew member via the input 106. Another option may include a not include option as illustrated in step (214). With this option, a crew member can select message element information to not include in a concatenated message to be downlinked. If a not include of a downlink message element information is selected at step (214), the downlink message element information will not be included in a concatenated message in a downlink message at step (216). In an embodiment, if the not select option is removed before the transmission of the concatenated message, the message element information is once again included into the concatenated message to be downlinked. In one embodiment, if the message element information remains in the not include option at downlink transmission, the message element remains available in the verify page for the next generation of a concatenated message to be transmitted. In yet another embodiment, the message element information that remains in the not include option is deleted upon transmission of the concatenated message. Hence, in embodiments, the deletion, modification and not include options is done at the verify page. Once the crew member has verified each downlink message element information are ready to be downlinked in a message, a downlink is initiated by the crew member. When it is determined a downlink has been initiated at step (218), the downlink message element information are concatenated into a single message and downlinked at step (220). The downlink is accomplished using the transmitter of the transceiver 112 discussed above in regards to FIG. 1.

Figure 3A:
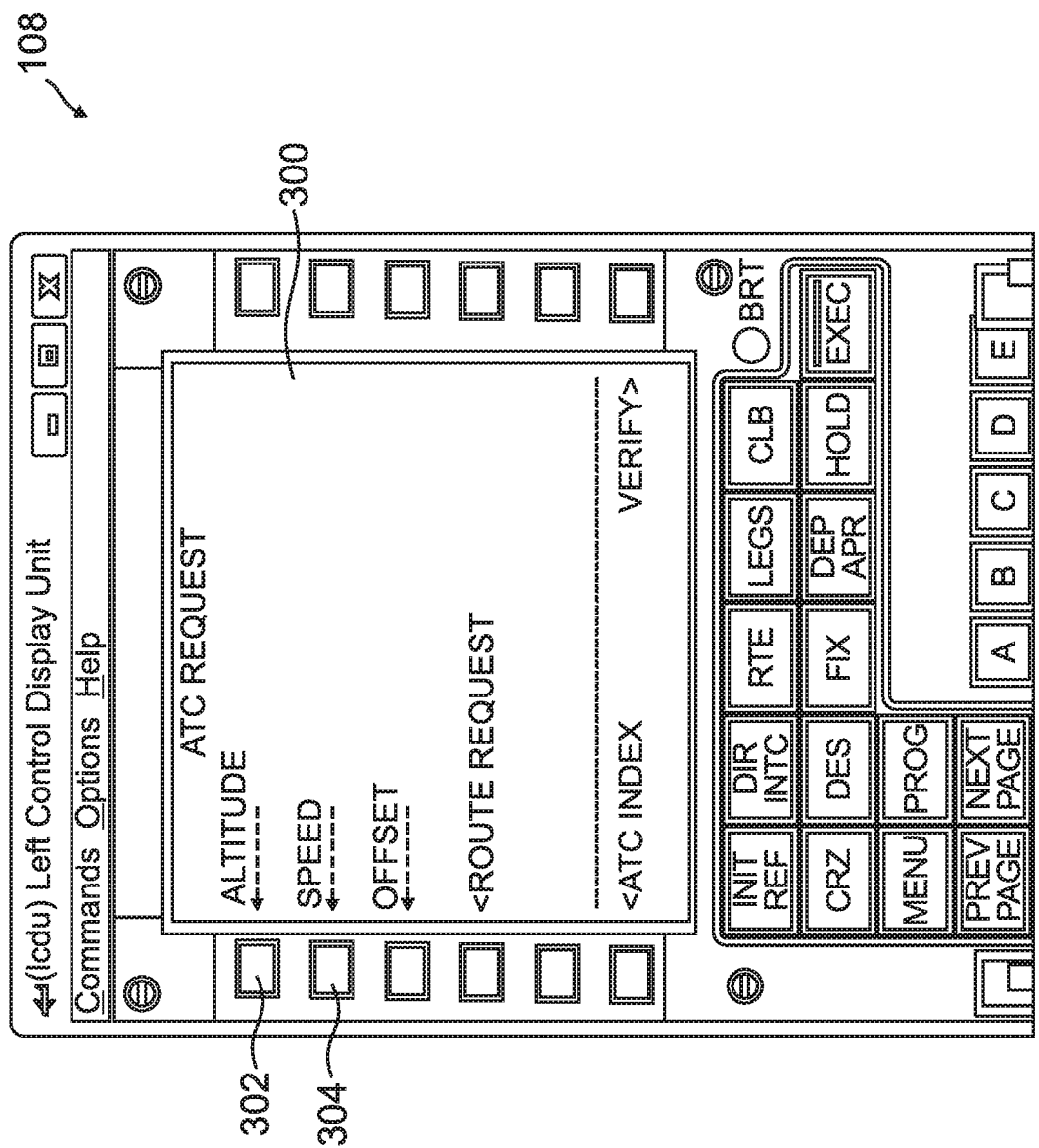
FIG. 3A is a screen shot of a Multipurpose Control Display Unit (MCDU) display illustrating a downlink message element page of an exemplary embodiment.

Referring to FIG. 3A, a display 108 illustrating a downlink message element selection page 300 of an exemplary embodiment is provided. As illustrated, the element selection page 300, of this example, allows at least an altitude request 302 and a speed request 304 to be entered. FIG. 3B illustrates the entering of an altitude request in an element page 320 and FIG. 3C illustrates the entering of a speed request at another element page 340. Although, there only two element pages 320 and 340 shown for illustration purposes, often a several element pages with several requests are needed. As discussed above, if a crew member needs to modify a message in a current system, the crew member must go back through the element pages 320 and 340 to find the element page that has the message that needs to be modified and modify the message there. Once the request(s) are entered on one or more of the element pages, a verify link 306 may be selected by a crew member.

Figure 4C:
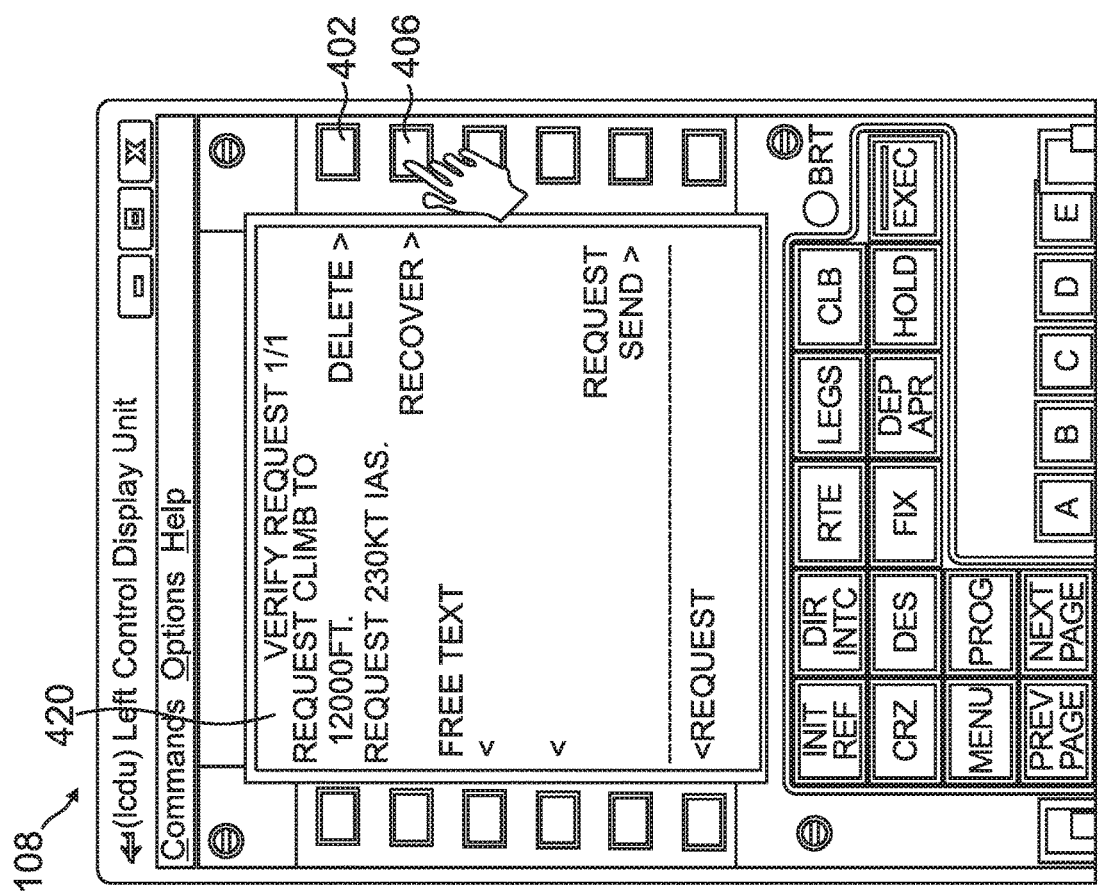
FIG. 4C is a screen shot of the display of FIG. 4B illustrating the activation of a delete option of an exemplary embodiment.
Figure 4D:
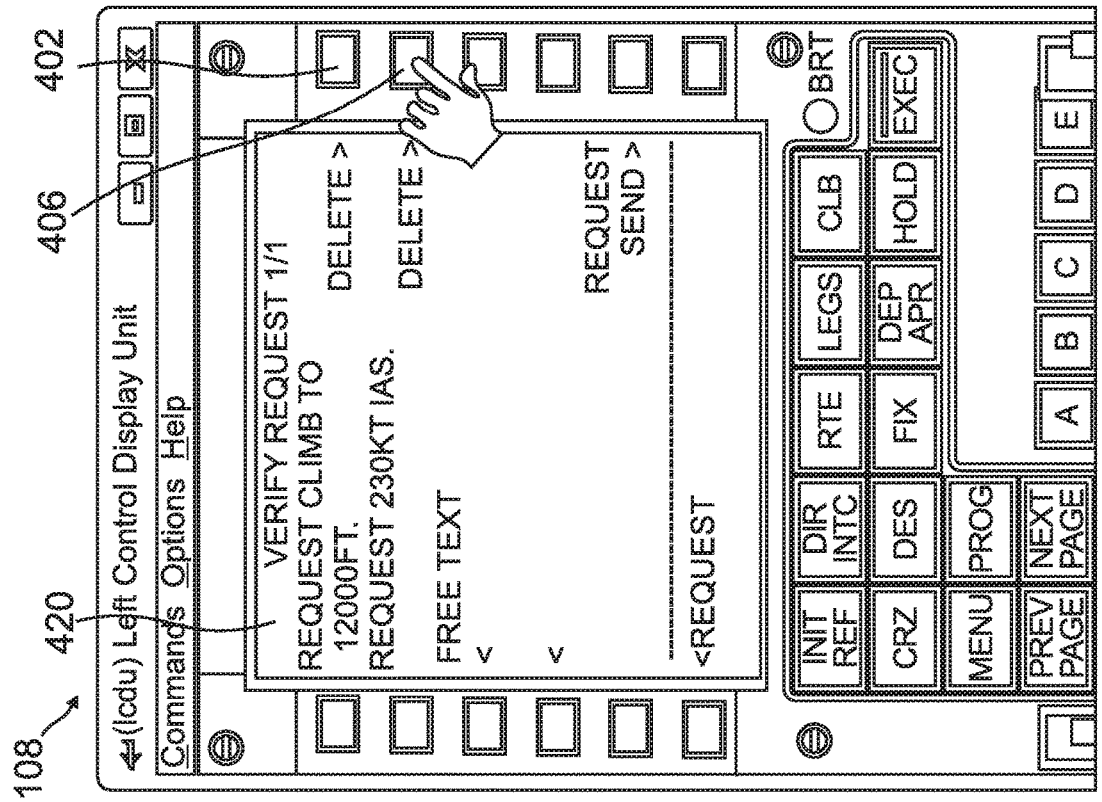
FIG. 4D is a screen shot of the display of FIG. 4B illustrating the activation of a recover option of an exemplary embodiment.

FIG. 4A illustrates the display 108 displaying a verify page 400 of an exemplary embodiment when the verify page was selected by the crew member. The verify page 400 illustrates an altitude downlink message element information, 12000 ft entered on the altitude element page, and the speed downlink message element information, 230 kt, entered in the speed element page 300. The verify page allows the crew member to review the requests before they are downlinked in a concatenated downlink message. In an exemplary embodiment, the verify page 420 includes a delete function with activation buttons 402 and 406 associated with each downlink message element information as illustrated in FIG. 4B. In an embodiment, hard buttons of a Multipurpose Control Display Unit (MCDU) are used as activation buttons as illustrated in FIG. 4B. In other embodiments displays with different types of input functions are used. Other types of displays that may be used include, but are not limited to, a Multifunction Display (MFD) display and a Control Display Unit (CDU). Examples of other types of input functions include, but are not limited to, radio buttons on a touch screen, curser control, keyboard, voice control etc. In the example of FIG. 4B, delete activation button 402 is associated with the entered altitude downlink message element information and delete activation button 406 is associated with the entered speed downlink message element information. Hence, either one of the downlink message element information can be deleted on the verify page 420 without having to go back through the element pages 320 and 340. FIG. 4C illustrates a crew member selecting a delete activation button 406 to delete the speed request information. In an embodiment, the delete information can be recovered with a recover option illustrated in FIG. 4D. FIG. 4D illustrates the crew member activating a recover activation button 406 (which was changed from the delete activation button to the recovery activation button upon delete activation) to recover the deleted speed request information. Hence, a deleted request can be recovered at the verify page 420 in an embodiment.

Another exemplary embodiment of a verify page 500 is illustrated in FIG. 5A. In this example, include/not include activation buttons 522 and 524 are provided on the verify page 500. Each include/not include activation button 522 and 524 is associated with a downlink message element information. In this example, include/not include activation button 522 is associated with the altitude downlink message element information and include/not include button 524 is associated with the speed downlink message element information. FIG. 5A illustrates a crew member activating include/not include activation button 524 to not include the speed request. FIG. 5B illustrates an indication that the speed downlink message element information is to not be included in a downlink. If downlink is activated, the speed downlink message element information will not be included in the ATC message. In an embodiment, a crew member can activate include/not include button 524 to once again include the speed request in a downlink message. In one embodiment, requests that have been selected to not be included in a downlink are deleted after a downlink has occurred. In another embodiment, the requests that have been selected to not be included in a downlink remain in the verify page after the downlink for inclusion in a later downlink message if desired.

Figure 6A:
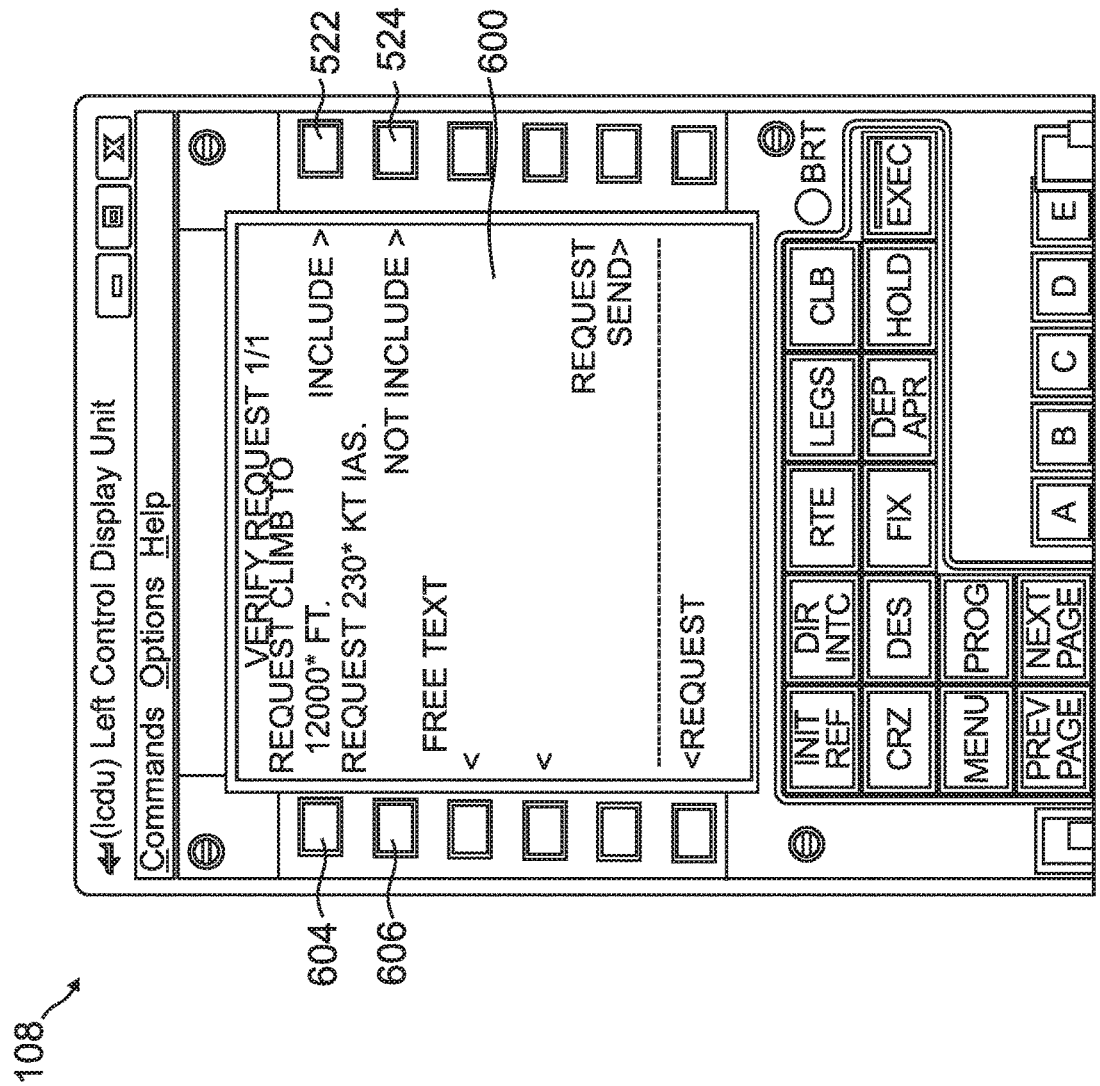
FIG. 6A is a screen shot of a display illustrating another verify screen of an exemplary embodiment including a modify option.

Further still another exemplary embodiment of a verify page 600 of the display 108 is illustrated in FIG. 6A. In this embodiment, the data attribute, i.e. the data entered relating to a downlink message element information, can be directly modified at the verify page 600 without having to go back to the element page. FIG. 6A illustrates the assigning of modify buttons 604 and 606 to associated downlink message element information. In particular, modify button 604 is associated with the altitude downlink message element information and modify button 606 is associated with the speed downlink message element information. FIG. 6B illustrates the entering of new downlink message element information at input entry line 602 and then the activation of modify button 604 to replace the old altitude downlink message element information with the new altitude downlink message element information. In this example, a new altitude request of 13000 ft is entered in the input entry line 602 to replace the old altitude request of 12000 ft. FIG. 6C illustrates that upon activation of the modify button 604, 13000 ft has replaced the 12000 ft in the verify page 600. The speed can also be modified by entering a new desired speed into the input entry line 602 and then activating the associated replacement button 606. Other configurations of the verify page are contemplated in deleting and modifying downlink message element information.

Example Embodiments

Example 1 is a method of operating an aircraft user interface used to convey messages between an aircraft crew and an air traffic controller is provided. The method includes providing at least one air traffic controller downlink message element page to the aircraft crew. A plurality of request options are provided on the at least one air traffic controller downlink message element page. Each request option allows the aircraft crew to enter associated downlink message element information to be sent concatenated together to the air traffic controller. The concatenated downlink message element information includes multiple downlink message element information. A verify page that allows the aircraft crew to review and modify the downlink message element information entered in the at least one air traffic control downlink message element page is provided before sending the entered concatenated downlink message element information to the air traffic controller. At least one of a delete option and an update option is provided on the verify page for at least one of the entered downlink message element information to allow for at least one of the deletion of the at least one of the entered downlink message element information and the updating of the at least one of the entered downlink message element information of the concatenated downlink message element information.

Example 2, includes the method of Example 1, further comprising the providing of a recover option on the verify page to allow for the recovery of at least one of deleted and updated information.

Example 3 includes the method of any of the Examples 1-2, further comprising the providing of a select/unselect function on the verify page to select and unselect entered downlink message element information to be at least one of deleted and updated.

Example 4 includes the method of any of the Examples 1-3, further comprising the providing of a non-transmission option on the verify page to selectively prevent the transmission of at least one of the entered requested information in the entered concatenated downlink message element information.

Example 5 includes the method of any of the Examples 1-4, further comprising the transmitting of the concatenated downlink message element information.

Example 6 includes a method of modifying downlink message element information in a vehicle communication system. The method includes; generating a plurality of downlink message element information at a verify screen displayed by a display; allowing for the changing of at least one downlink message element information of the plurality of downlink message element information within the verify screen; and concatenating the plurality of downlink message element information after the changing of the at least one element information in preparation of generating a concatenating downlink message element information message to be downlinked.

Example 7, includes the method of Example 6, wherein changing of the at least one downlink message element information further comprises deleting the at least one element information.

Example 8, includes the method of any of the Examples 6-7, wherein changing of the at least one downlink message element information further comprises updating the at least element information.

Example 9, includes the method of any of the Examples 6-8, wherein changing of the at least one downlink message element information further comprises not including at least one element information so that the not included at least one element information is not included in the concatenated downlink element information.

Example 10, includes the method of Example 9, further comprising including the not included at least one downlink message element information upon receiving an include request.

Example 11, includes the method of any of the Examples 6-9, further comprising downlinking the concatenating downlink message element information message.

Example 12, includes the method of any of the Examples 6-10, wherein generating the plurality of downlink message element information at a verify screen displayed by a display further comprises verifying a plurality of input requests to be downlinked.

Example 13, is a communication system. The communication system includes a transmitter, an input, a display, at least one memory and at least one processor. The transmitter is used to transmit datalink messages. The input provides a conduit for crew requests. The display included input functions and is positioned to be viewed and used by a crew member. The at least one memory stores operation instructions including a downlink application. The at least one processor is in communication with the transmitter, the input, the display and memory. The at least one processor is configured to execute the operation instructions stored in the at least one memory. The processor is configured to provide element pages on the display that allow a crew member to enter input requests via the input. The processor is further configured to display a verify page upon activation of a verify link by the crew member on the display. The verify page includes downlink message element information associated with each request entered on the element pages. The processor is further configured to execute the downlink application to allow for the changing of at least one downlink message element information by the crew member on the verify screen before a transmission of a concatenated downlink message including the downlink message element information.

Example 14, includes the communication system of Example 13, wherein the allowing for the changing of the at least one downlink message element information further comprises deleting the at least one element information.

Example 15, includes the communication system of any of the Examples 13-14, wherein the allowing for the changing of the at least one downlink message element information further comprises updating the at least element information.

Example 16, includes the communication system of any of the Examples 13-15, wherein the allowing for the changing of the at least one downlink message element information further comprises putting a not include item on the at least one element information so that the at least one element information is not included in the concatenated downlink element information.

Example 17, includes the communication system of any of the Examples 13-16, wherein the processor is further configured to remove the not include item on the at least one downlink message element information upon receiving a include request.

Example 18, includes the communication system of any of the Examples 13-17, wherein the processor is further configured to downlink the concatenating downlink message element information message via the transceiver.

Example 19, includes the communication system of any of the Examples 13-18, wherein the display is one of a Multipurpose Control Display Unit (MCDU), a Multifunctional Display (MFD) display and a Control Display Unit (CDU).

Example 20, includes the communication system of any of the Examples 13-19, wherein the input functions of the display include at least one of functions of a touchscreen, a curser control, a voice control, a physical button and a keyboard.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating an aircraft user interface used to convey messages between an aircraft crew and an air traffic controller, the method comprising:
   providing at least one air traffic controller downlink message element page to the aircraft crew;
   providing a plurality of request options on the at least one air traffic controller downlink message element page, each request option allowing the aircraft crew to enter associated downlink message element information to be sent concatenated together to the air traffic controller, the concatenated downlink message element information including multiple downlink message element information;
   providing a verify page that allows the aircraft crew to review and modify the downlink message element information entered in the at least one air traffic controller downlink message element page before sending the entered concatenated downlink message element information to the air traffic controller, the verify page replacing the at least one air traffic controller downlink message element page upon activation of a verify link; and
   providing an update option on the verify page for at least one of the entered downlink message element information to allow for the updating of the at least one of the entered downlink message element information of the concatenated downlink message element information at the verify page, the update option on the verify page including an input entry line used to enter replacement information and at least one modify activation function configured to update an associated entered downlink message element information with replacement information entered in the input entry line upon activation.

2. The method of claim 1, further comprising:
   providing a delete option on the verify page to allow for the deletion of the at least one of the entered downlink message element information; and
   providing a recover option on the verify page to allow for the recovery of at least one of deleted and updated information.

3. The method of claim 1, further comprising:
   providing a select/unselect function on the verify page to select and unselect entered downlink message element information to be at least one of deleted and updated.

4. The method of claim 1, further comprising:
   providing a non-transmission option on the verify page to selectively prevent the transmission of at least one of the entered requested information in the entered concatenated downlink message element information.

5. The method of claim 1, further comprising:
   transmitting the concatenated downlink message element information.

6. A method of modifying downlink message element information in a vehicle communication system, the method comprising:
   generating a plurality of downlink message element information at a verify screen displayed by a display, the verify screen replacing at least one element page upon activation of a verify link;
   allowing for the updating of at least one downlink message element information of the plurality of downlink message element information within the verify screen, wherein allowing the updating of the at least one downlink message element information within the verify screen includes,
   providing an input entry line that is used to enter replacement information, and
   proving at least one modify activation function that is configured to update an associated entered downlink element message information with replacement information in the input entry line upon activation, and
   concatenating the plurality of downlink message element information after the updating of the at least one element information in preparation of generating a concatenating downlink message element information message to be downlinked.

7. The method of claim 6, further comprising:
   allowing for the deletion of the plurality of downlink message element information within the verify screen.

8. The method of claim 6, further comprising:
   providing a non-transmission option for individual down link element information within the concatenating downlink message element information at the verify page.

9. The method of claim 8, further comprising:
   providing down link element information selected to not be included in a current transmission in a next generation of concatenated message to be transmitted at the verify page.

10. The method of claim 8, further comprising:
    including the not included downlink message element information upon receiving an include request.

11. The method of claim 6, further comprising:
    downlinking the concatenating downlink message element information message.

12. The method of claim 6, wherein generating the plurality of downlink message element information at a verify screen displayed by a display further comprises:
    verifying a plurality of input requests to be downlinked.

13. A communication system comprising:
    a transmitter to transmit datalink messages;
    an input to provide a conduit for crew requests;
    a display with input functions positioned to be viewed and used by a crew member, the input functions including an input entry line and at least one modify activation function;
    at least one memory, the at least one memory storing operation instructions including a downlink application; and
    at least one processor in communication with the transmitter, the input, the display and memory, the at least one processor configured to execute the operation instructions stored in the at least one memory, the processor configured to provide element pages on the display allowing a crew member to enter input requests to be downlinked via the input, the processor further configured to display a verify page upon activation of a verify link by the crew member on the display that replaces the element pages, the verify page including downlink message element information associated with each request entered on the element pages, the processor configured to execute the downlink application to allow for the changing of at least one downlink message element information by the crew member on the verify screen with the input entry line that is used to enter replacement information and at the least one modify activation function that is used to update an associated entered downlink message element information with replacement information entered in the input entry line upon activation before a transmission of a concatenated downlink message including the downlink message element information, the processor further configured to execute the downlink application to allow a non-transmission option on the verify page to selectively prevent the transmission of at least one of the entered requested information in an entered concatenated downlink message element information.

14. The communication system of claim 13, wherein the allowing for the changing of the at least one downlink message element information further comprises:
   deleting the at least one element information.

15. The communication system of claim 13, wherein the allowing for the changing of the at least one downlink message element information further comprises:
   updating the at least element information.

16. The communication system of claim 13, wherein the allowing for the changing of the at least one downlink message element information further comprises:
   putting a not include item on the at least one element information so that the at least one element information is not included in the concatenated downlink element information.

17. The communication system of claim 13, wherein the processor is further configured to remove the not include item on the at least one downlink message element information upon receiving an include request.

18. The communication system of claim 13, wherein the processor is further configured to downlink the concatenating downlink message element information message via the transceiver.

19. The communication system of claim 13, wherein the display is one of a Multipurpose Control Display Unit (MCDU), a Multifunctional Display (MFD) display and a Control Display Unit (CDU).

20. The communication system of claim 13, wherein the input functions of the display include at least one of functions of a touchscreen, a curser control, a voice control, a physical button and a keyboard.

* * * * *